United States Patent

Jain

(10) Patent No.: US 10,374,869 B2
(45) Date of Patent: Aug. 6, 2019

(54) CONTAINERIZED ARCHITECTURE TO MANAGE INTERNET-CONNECTED DEVICES

(71) Applicant: MOBILE IRON, INC., Mountain View, CA (US)

(72) Inventor: Sandeep Jain, Mountain View, CA (US)

(73) Assignee: MOBILE IRON, INC., Mountain View, CA (US)

(*) Notice: Subject to any disclaimer, the term of this patent is extended or adjusted under 35 U.S.C. 154(b) by 175 days.

(21) Appl. No.: 15/270,948

(22) Filed: Sep. 20, 2016

(65) Prior Publication Data

US 2017/0099176 A1    Apr. 6, 2017

Related U.S. Application Data

(60) Provisional application No. 62/222,029, filed on Sep. 22, 2015.

(51) Int. Cl.
*H04L 12/24* (2006.01)
*H04L 29/08* (2006.01)
*H04L 29/06* (2006.01)

(52) U.S. Cl.
CPC ............ *H04L 41/046* (2013.01); *H04L 67/12* (2013.01); *H04L 67/42* (2013.01)

(58) Field of Classification Search
CPC ........ H04L 41/046; H04L 67/12; H04L 67/42
See application file for complete search history.

(56) References Cited

U.S. PATENT DOCUMENTS

| | | | | |
|---|---|---|---|---|
| 8,104,077 | B1* | 1/2012 | Gauvin | H04L 65/1079 726/12 |
| 2007/0056046 | A1* | 3/2007 | Claudatos | G06F 21/57 726/28 |
| 2015/0029894 | A1 | 1/2015 | Lu | |
| 2015/0113627 | A1* | 4/2015 | Curtis | H04L 63/06 726/10 |
| 2015/0172215 | A1* | 6/2015 | Claydon | H04L 63/0272 709/225 |
| 2015/0180951 | A1 | 6/2015 | Bärnreuther | |
| 2015/0347114 | A1* | 12/2015 | Yoon | G06F 8/61 235/375 |
| 2016/0094421 | A1* | 3/2016 | Bali | H04L 43/04 709/223 |
| 2016/0142906 | A1* | 5/2016 | Park | H04W 8/205 455/419 |
| 2016/0147506 | A1* | 5/2016 | Britt | G06F 8/36 717/107 |
| 2017/0054563 | A1* | 2/2017 | Verma | G06F 8/65 |
| 2017/0099176 | A1* | 4/2017 | Jain | H04L 41/046 |

* cited by examiner

*Primary Examiner* — Tauqir Hussain
*Assistant Examiner* — Jsing Forng Lin
(74) *Attorney, Agent, or Firm* — Van Pelt, Yi & James LLP

(57) ABSTRACT

A containerized architecture to secure and manage Internet-connected devices, such as "Internet of Things" devices, is disclosed. In various embodiments, one or more containerized applications are run, e.g., on an Internet of Things gateway, subject to management by the management server. At least one of the containerized applications is a management agent configured to participate, subject to control of the management server, in management of one or more other of said containerized applications.

19 Claims, 8 Drawing Sheets

CONTAINERIZED ARCHITECTURE TO MANAGE INTERNET-CONNECTED DEVICES

CROSS REFERENCE TO OTHER APPLICATIONS

This application claims priority to U.S. Provisional Patent Application No. 62/222,029 entitled CONTAINERIZED ARCHITECTURE TO MANAGE INTERNET-CONNECTED DEVICES filed Sep. 22, 2015 which is incorporated herein by reference for all purposes.

BACKGROUND OF THE INVENTION

It is anticipated that the "Internet of Things" ("IoT") revolution will encompass innumerable, specialized, non-software innovations, including without limitation in sensor technologies, power consumption, and data transmission and receipt.

As used herein, the term "Internet of Things" or "IoT" refers to physical objects having embedded hardware and/or software and network connectivity, e.g., via the Internet, to other such objects and/or other nodes, services, systems, etc. Emerging examples include sensors, security devices, household appliances, entertainment components, and personal electronics, but the Internet of Things could include any physical object.

IoT devices may be configured to sense the physical environment, may comprise edge devices that perform data acquisition from the physical environment, and/or may change the physical environment, among other activities. IoT devices may communicate over IP(v6) and/or other protocols.

BRIEF DESCRIPTION OF THE DRAWINGS

Various embodiments of the invention are disclosed in the following detailed description and the accompanying drawings.

DETAILED DESCRIPTION

Figure 1:
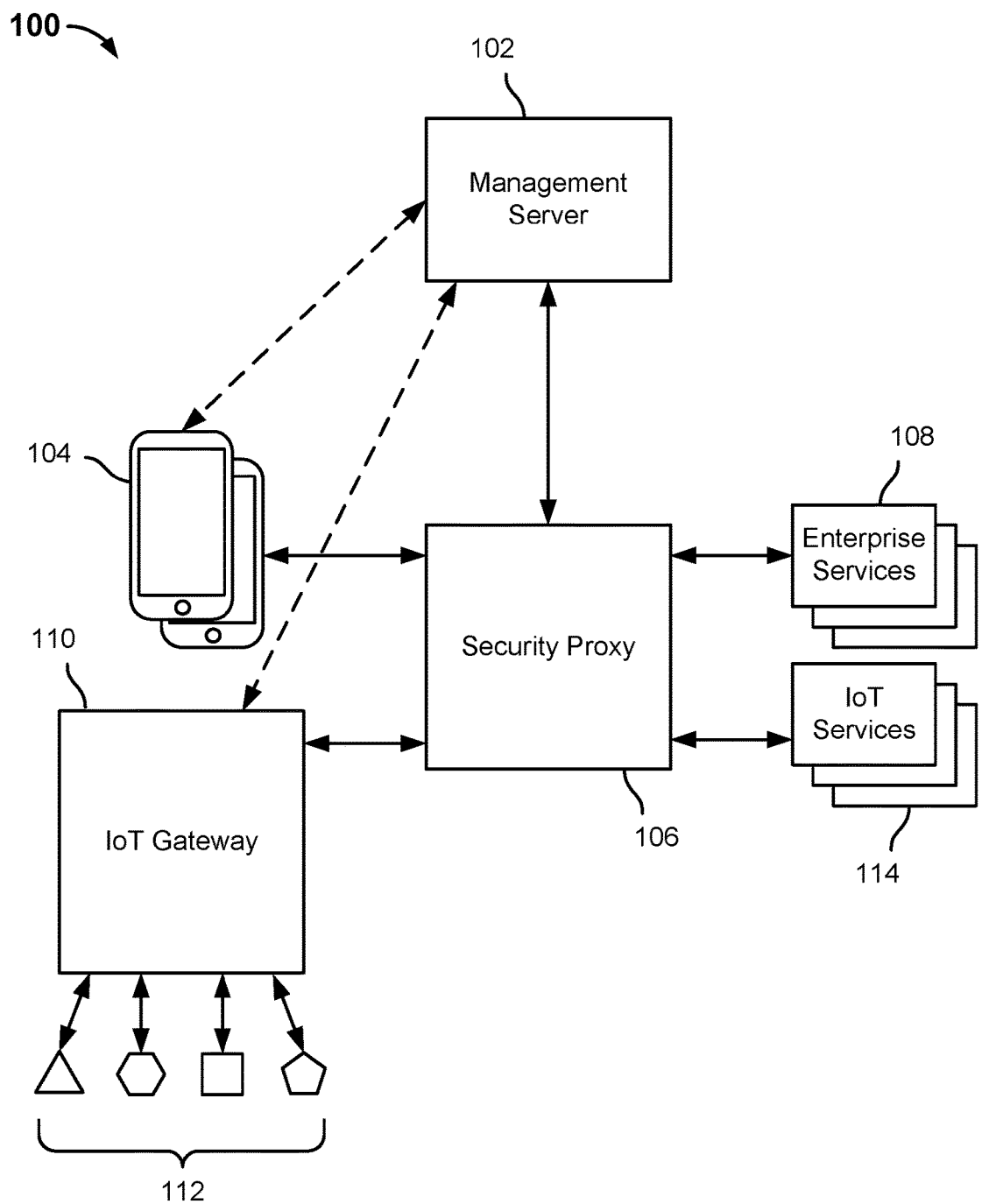
FIG. 1 is a block diagram illustrating an embodiment of a system to provide containerized management of network connected devices.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A containerized architecture to manage Internet-connected client devices, such as IoT devices, is disclosed. In various embodiments, containerization technology provides an isolated, resource controlled, and portable environment in which to run apps, applications, or other code. In various embodiments, sensors or other IoT devices may be managed and provided network connectivity via an IoT gateway. Sensors may be virtualized, be managed, including by controlling access to such sensors by IoT or other applications and services, and a secure identity may be provided to each sensor. An "edge agent" or other software may be installed on an IoT gateway to provision, secure, and manage the gateway, associated sensors, and applications installed on the gateway. The applications may comprise "smart" applications configured to use sensors associated with the gateway to invoke and use sensors, such as to gather data. Sensors may be invoked via specialized software, sometimes referred to herein as containerized "sensor drivers", which may be configured to provide secure (controlled) access to sensor via a consistent API or other interface, regardless of the physical sensor.

A containerization architecture, such as the Linux Containers (LXC) running on Linux™ operating system, may be used to provide a resource controlled environment for isolation. For examples, smart or other IoT apps, sensor drivers, and the edge agent may each run in a separate container on the IoT gateway. The edge agent may run in a container have higher level privileges and may be configured and used, via a remote Enterprise Mobility Management (EMM) or other management server, to manage and control the installation of sensor drivers, apps, and other resources on the IoT gateway, and to configures such apps and other resources to implement policies set by an administrative user.

In various embodiments, the apps may be configured to access backend services, such as IoT services, enterprise app services, etc., only via a security proxy. The security proxy may be configured to provide access according to configuration and/or state information, including gateway and/or other security or other posture information.

FIG. 1 is a block diagram illustrating an embodiment of a system to provide containerized management of network connected devices. In the example shown, integrated device management system and environment 100 includes a management server 102, e.g., an enterprise mobility management (EMM) or other server configured to manage IoT devices, applications, and services as disclosed herein. In the example shown, management server 102 also performs mobile device management with respect to mobile devices 104, which may include smartphones, tablets, laptops, or other mobile computing devices. A uniform user interface may be used to control front-end devices by using EMM for IoT.

In various embodiments, management server 102 may manage mobile devices 104 by performing one or more of facilitating or requiring device registration; configuring devices and/or applications or other resources installed thereon; installing, provisioning, and/or configuring a management agent (e.g., a management application or app) on the device; and receiving, determining, and/or processing security or other state information to determine a security posture of each device 104. Management server 102 may interact with security proxy 106 to provide managed access to backend services 108. For example, backend servers on an enterprise network may provide enterprise services 108. Security proxy 106 may be configured to provide secure access to backend services 108 by users of devices 104. In various embodiments, for each device 104 access may be managed (e.g., provided without restriction, provided subject to restrictions, or blocked) by security proxy 106 based on state and/or context information, including by way of example and without limitation a security posture of the device 104 as indicated by management server 102, a global security state or information, and context information such as time of day, current geographic location of the device 104, etc.

In the example shown, management server 102 and security proxy 106 in addition manage IoT devices associated with an IoT gateway 110. In the example shown, IoT gateway 110 serves as a gateway node for a plurality of associated sensors 112. Sensors 112 may include any physical sensing device, including without limitation environmental (e.g., temperature, wind) sensors; optical sensors, such as a camera or photodiode; audio sensors, such as a microphone; smell sensors; vibration or other motion detector; seals or other tamper detection devices; biometric input devices such as hand, retina, and fingerprint scanners; and manual input devices such as buttons, knobs, levers, keypads, etc.; or any other device capable to detecting a value or event taking place in a physical space in which the device is located and/or capable of being altered by or altering a physical environment in which the device is located.

In the example shown, management server 102 and security proxy 106 cooperate to provide managed access to IoT services 114. For example, access to devices 112 may be managed at least in part by installing on IoT gateway 110 and configuring one or more apps configured to control one or more of sensors 112; consume data or other output or signal data generated by sensors; and/or interact via sensors 112 with a physical space in which sensors 112 may be located. Security proxy 106 may be configured to terminate a secure connection, such as a tunnel connection, to the gateway 110 and/or one or more applications or other entities installed on gateway 110. Security proxy 110 may be configured to use secure connections to backend IoT services 114 to proxy connections and/or communications between apps on gateway 110 and backend IoT services 114.

Examples of IoT services 114 may include, without limitation, services that consume and use data generated by sensors 112 to expose related (e.g., reporting, monitoring, analysis) services to client devices and/or systems associated with users of such services 114. For example, temperature sensors 112 may be used to monitor the temperature in a plurality of physical locations, each associated with a corresponding IoT gateway 110. Apps on the respective gateways 110 may report data to a corresponding IoT service 114 via security proxy 106. The IoT service may analyze the data, aggregate and report the data, generate alerts based on the data, etc., and provide related information or other services to local or remote client devices and systems (not shown in FIG. 1).

In various embodiments, access by apps running on IoT gateway 110 to backend IoT (or other) services 114 may be managed by security proxy 106 in the same way (or similar ways) as access by mobile devices 104 to enterprise services 108. For example, in some embodiments, access may be managed at least in part by enforcing one or more policies, including without limitation by taking into consideration sensor and/or gateway security or other state or posture information, threat detection from anomalous sensor data behavior, and context data such as time of day, day of the week, etc.

Figure 2:
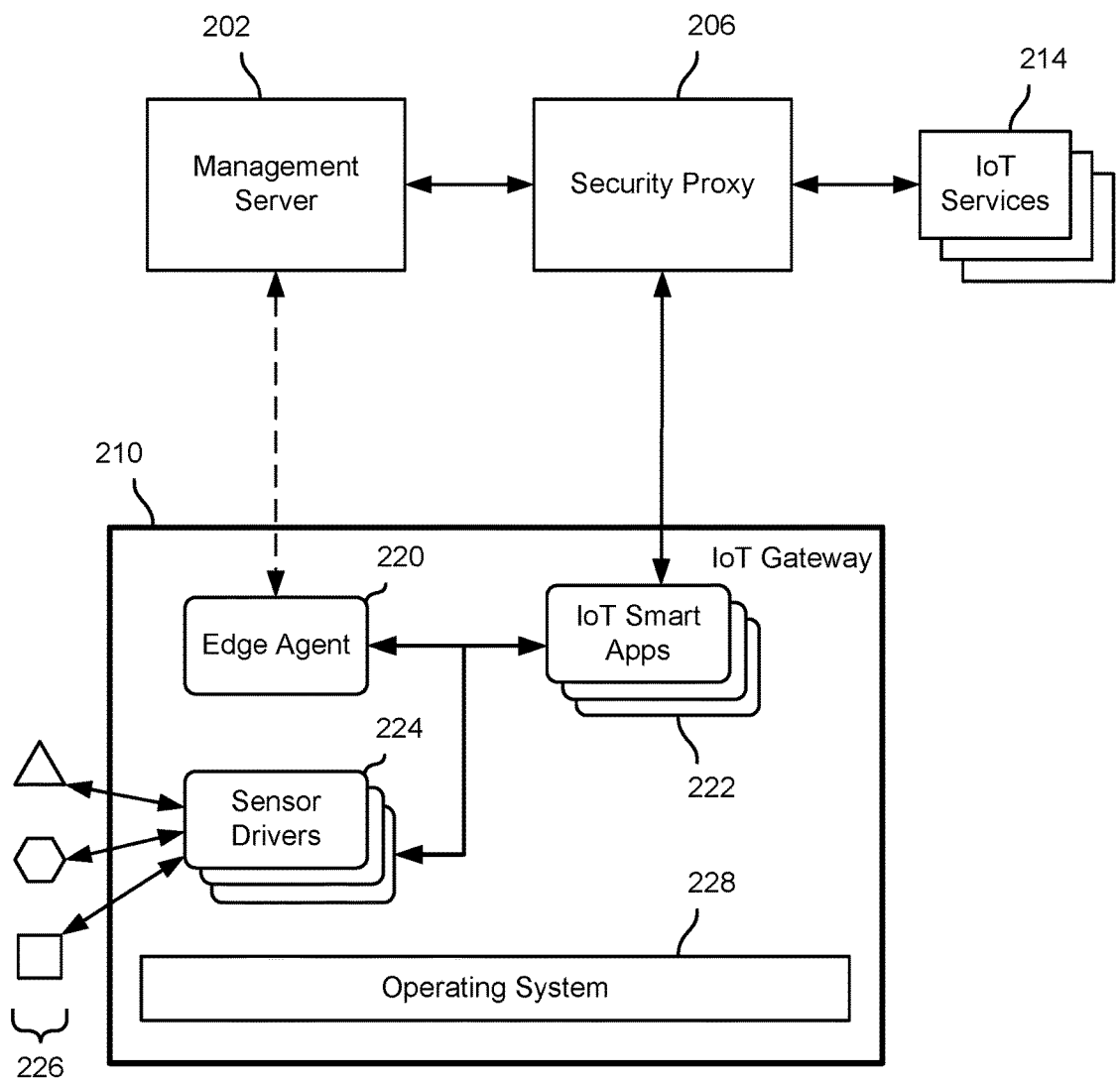
FIG. 2 is a block diagram illustrating an embodiment of a system to provide containerized management of network connected devices.

FIG. 2 is a block diagram illustrating an embodiment of a system to provide containerized management of network connected devices. In the example shown, management server 202 and security proxy 206 cooperate to provide managed access to IoT services 214 by apps, sensors, and/or other resources comprising and/or otherwise associated with IoT gateway 210. IoT gateway 210 has installed thereon a management agent identified in FIG. 2 as edge agent 220. Edge agent 220 may be installed on IoT gateway 210 by/from an app store, which may be hosted on management server 202 in some embodiments, and configured by management server 202 to be used to manage other resources on and/or associated with gateway 210 as disclosed herein. In various embodiments, gateway 210 may comprise a lightweight computing device comprising one or more processors; memory devices; power modules and components such as batteries, power supplies, etc.; communication buses and connections; physical ports and traces or wires to connect such ports to other components; etc. In some embodiments, gateway 210 may be a Raspberry Pi™ or similar lightweight, low cost computing device.

Edge agent 220 is configured in various embodiments to install, configure, and manage apps installed on gateway 210, such as IoT smart apps 222 and sensor drivers 224 in the example shown. Sensor drivers 224 each may comprise a specialized app that performs security, admin, and management functions beyond those performed by traditional driver software. In various embodiments, sensor drivers 224 are configured to provide access to a corresponding one or more of sensors 226 via a consistent, easy-to-use, well-published API or other interface. Sensor drivers 224 may provide to apps 222 secure and/or managed access to sensors 226 and/or data provided by sensors 226. In various embodiments, sensor drivers 224 may prevent apps 222 from altering a configuration or operation of sensors 226. For example, edge agent 220 may configure sensor drivers 224 to configure, operate, and/or manage access to sensors 226 in a manner specified by a policy or other configuration data, such as administrative commands entered via an interface of management server 202. Sensor drivers 224 may serve as an input/output multiplexer for physical port (not shown in FIG. 2) of gateway 210. Sensor drivers 224 may allow administrative commands, policies, etc. to be used to control which business apps are allowed to communicate with which sensors. In some embodiments, sensor drivers such as sensor drivers 224 may be downloaded from an authorized (e.g., enterprise-managed) app store, and may be updated and/or managed in the same manner as other apps.

Edge agent 220, smart apps 222, and sensor drivers 224 each may comprise a containerized application running in a container provided on gateway 210 using a containerization platform, architecture, and/or technology, such as Linux Containers (linuxcontainers.org). Edge agent 220 may comprise a privileged containerized application. For example, edge agent 220 may run in a container that includes capabilities required to manage apps 222 and/or sensor drivers 224, as disclosed herein. In various embodiments, each containerized application (e.g., edge agent 220, apps 222, and drivers 224) runs on top of an operating system 228, such as the Linux™ operating system.

In various embodiments, managed apps 222 may be configured to provide to IoT services 214, via security proxy 206, data comprising and/or derived from output of sensors 226. In various embodiments, data may be aggregated, filtered, selectively reported, compressed, encrypted, and/or otherwise pre-processed by one or more of apps 222, resulting in less data and/or value added data being communicated to IoT services 214, resulting in consumption of less network communication and backend storage and processing resources than may have been required or consumed absent such pre-processing.

In another example of gateway-side processing, sensor drivers 224 may be configured to detect tampering, failure, or other state or context data affecting sensors 226. In various embodiments, sensor drivers 224 may be configured to report such information to management server 202, which may in response update a security posture and/or other state and/or context data associated with the affected sensor, the gateway 210, and/or applicable ones of apps 222 installed thereon. For example, apps 222 may be prevented from sending to IoT services 214 data obtained from a potentially compromised sensor 226, either by changing the behavior of the app 222 (for example, by using edge agent 220 to change the app's configuration data) or by blocking or stripping such data at security proxy 206, e.g., in response to security posture information received from management server 202.

Figure 3:
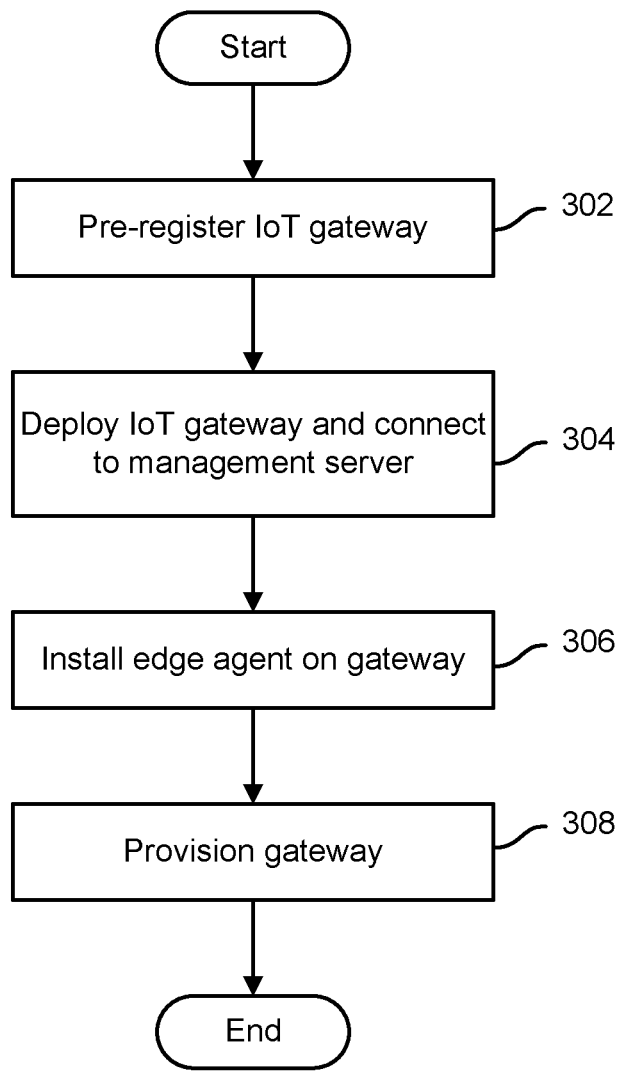
FIG. 3 is a flow chart illustrating an embodiment of a process to provision and configure an IoT gateway.

FIG. 3 is a flow chart illustrating an embodiment of a process to provision and configure an IoT gateway. In various embodiments, the process of FIG. 3 may be implemented by a management server, such as management server 102 of FIG. 1 or management server 202 of FIG. 2, to provide an IoT gateway device, such as gateway 110 of FIG. 1 or gateway 210 of FIG. 2. In the example shown, an IoT gateway is pre-registered (302). For example, an administrative user may use a web-based or other interface of a management server, such as management servers 102 and 202, to create a record of the gateway; assign to the gateway a corresponding identity, such as a certificate; associate the gateway with one or more groups, designations, and/or configuration/management policies; etc. The pre-registered gateway is deployed, e.g., to an associate physical location, and connected to the management server, e.g., via a wireless, wired, or other network connection available at the physical location to which the gateway has been deployed (304). In some embodiments, physical custody and control of the gateway may be maintained very careful, to ensure the gateway is not tampered with en route to being deployed at a destination physical location. The management server is used to install an edge agent on the gateway (306). For example, a native management agent of the gateway, if present, may be used to install and configure the edge agent. In some embodiments, an administrative user account and/or credential may be used to install the edge agent. The edge agent may be configured automatically, e.g., to enforce one or more policies associated with the gateway at the management server.

The gateway is provisioned (308). For example, an image or other encapsulation of an IoT gateway as disclosed herein may be downloaded and installed on a hardware device comprising the gateway. An operating system may be installed, configured, and/or brought under management. In some embodiments, the IoT gateway disclosed herein may itself be a containerized application, such as a Linux container, within which a other containerization environment is run that includes containerized apps such as smart IoT apps and/or sensor drivers. In some embodiments, provisioning the gateway may include one or more of providing an identify, such as via a certificate, providing policy and/or configuration data to be enforced locally, connecting the gateway to an associated security proxy, etc.

In various embodiments, containerized apps, such as IoT smart apps, and sensor drivers, may be installed and configured on an IoT gateway as disclosed herein. For example, the management server and edge agent may cooperate to install one or more smart apps and/or one or more sensor driver apps on the gateway, and to configure such apps according to applicable policies. In some embodiments, the smart apps and/or sensor drivers each may comprise a containerized app that is downloaded to the gateway in the form of a containerization-friendly binary image or similar encapsulation, obtained from an associated universally accessible resource such as an image registry, such as one installed on and/or otherwise associated with the management server.

Figure 4:
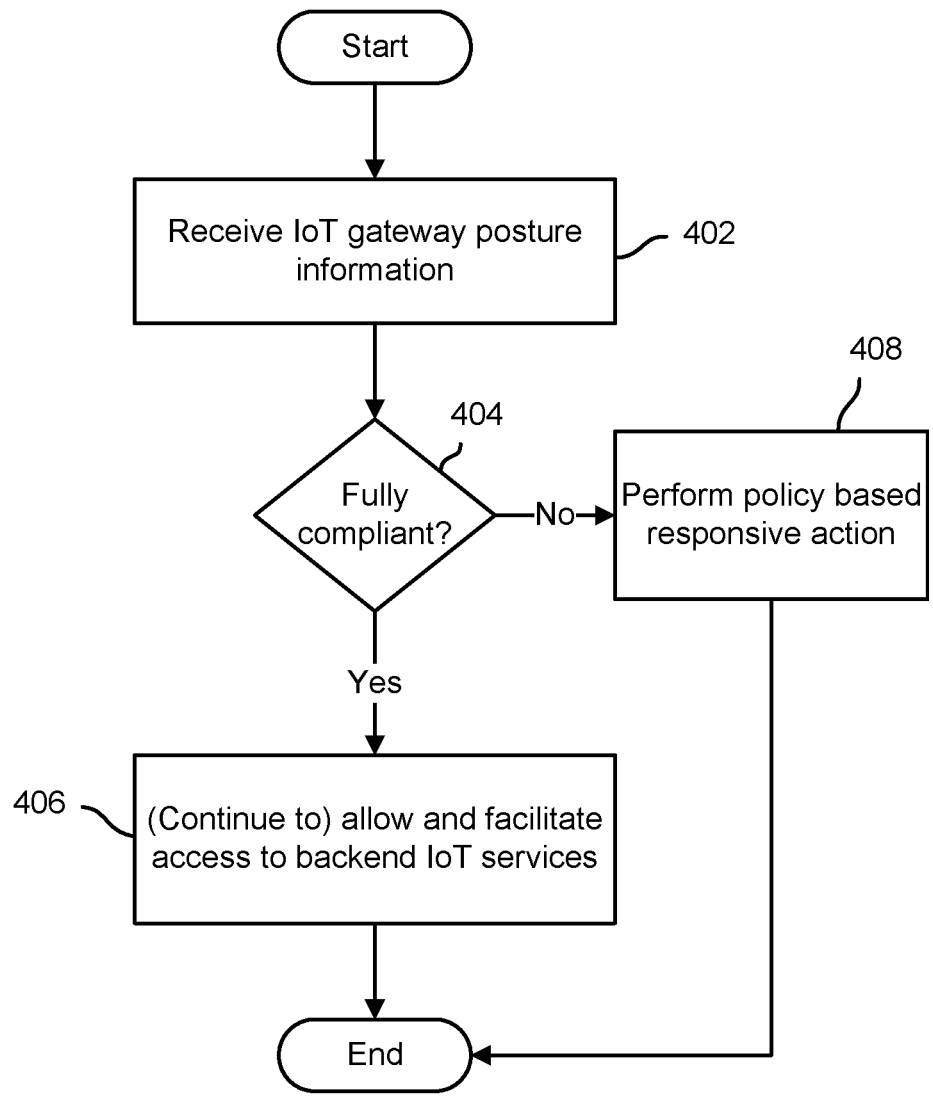
FIG. 4 is a flow chart illustrating an embodiment of a process to provide security posture and/or policy-based access to backend services.

FIG. 4 is a flow chart illustrating an embodiment of a process to provide security posture and/or policy-based access to backend services. In various embodiments, the process of FIG. 4 may be implemented by a security proxy, such as proxy 106 of FIG. 1 or proxy 206 of FIG. 2. In the example shown, IoT gateway (and/or associated) posture information is received (402). In some embodiments, a security proxy may receive posture information from a management server. For example, if the management server detects a change in gateway security posture—e.g., too much time since last check in, unauthorized app installed, unauthorized change to an app or its configuration, tampering with gateway, a sensor, apps, and/or drivers detected, etc.—the management server may notify the security proxy 106 of the updated posture of the gateway. If the gateway is/remains fully compliant (404), the security proxy (or other node) allows/continues to allow access to associated backend IoT services (406). If the gateway is not fully compliant (404), a policy-based responsive action is taken (408). In various embodiments, the responsive action may be indicated by a policy or other configuration data. The nature and/or scope of the response may be determined programmatically based on the specific applicable security posture information. For example, a change to a state indicating that a particular sensor may have been tampered with may result in the security proxy or other node blocking data from that sensor only. Installation of an unauthorized and potentially malicious app on the gateway, by contrast, may result in all communications from that gateway being blocked and/or quarantined.

Figure 5:
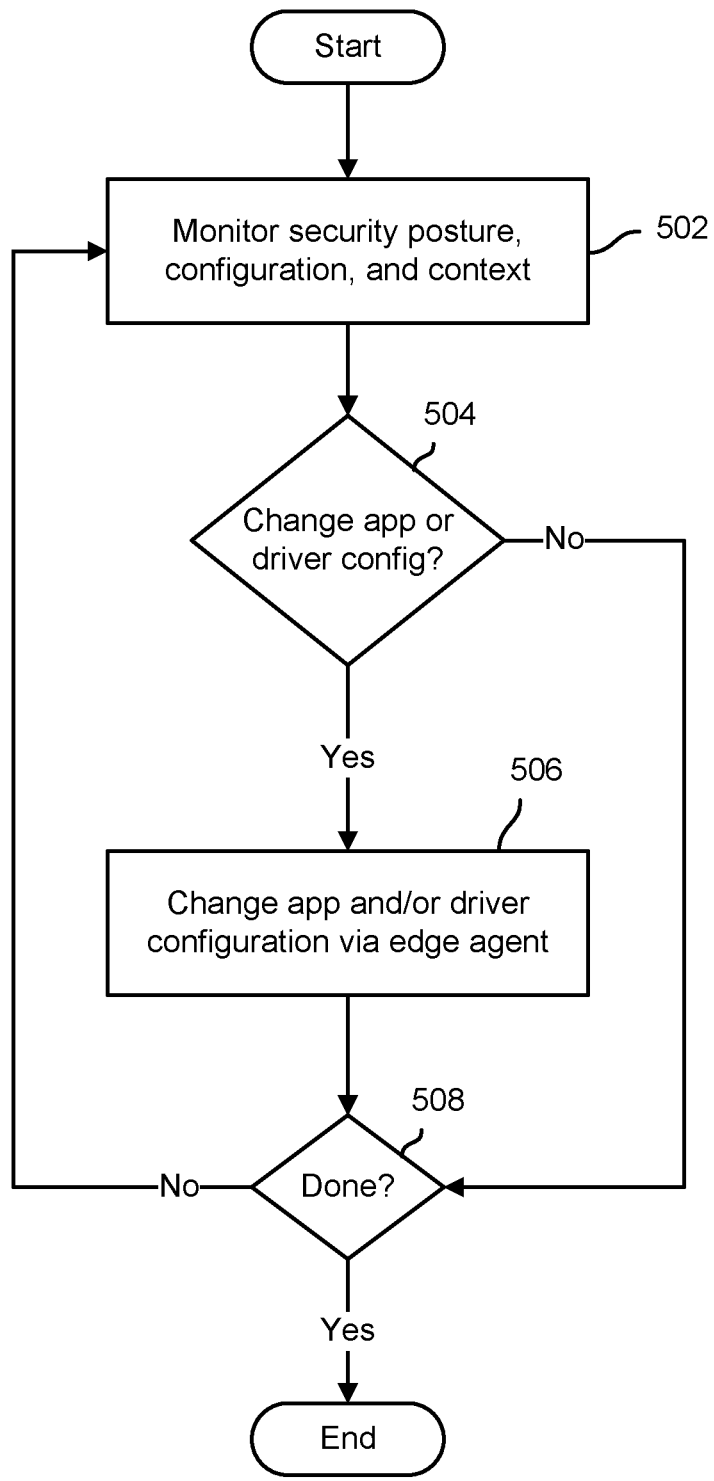
FIG. 5 is a flow chart illustrating an embodiment of a process to perform security posture and/or policy-based management and configuration of resources comprising or other associated with an IoT gateway.

FIG. 5 is a flow chart illustrating an embodiment of a process to perform security posture and/or policy-based management and configuration of resources comprising or other associated with an IoT gateway. In some embodiments, the process of FIG. 5 may be performed by a management server to provide a response to be implemented at a gateway based on security or other posture, configuration, and/or context information. In some embodiments, the process of FIG. 5 may be implemented at an IoT gateway, such as by an edge agent installed on an IoT gateway, to provide a local response to security posture and/or other information.

In the example shown, security posture, configuration, and/or context information are monitored (502). For example, an edge agent may monitor the configuration of IoT smart apps, sensor drivers, sensors, and/or other resources comprising and/or otherwise associated with a gateway to detect configuration changes, tampering with physical sensors, connectors, or ports, etc. In some embodiments, an edge agent may report posture, configuration, and context data, e.g., to a management server. In some embodiments, posture, configuration, and/or context data may be provided by external sources, such as an administrator, or a third party system, such as an intrusion detection system or other security system.

If received security posture, configuration, and/or context data indicates that a change in app and/or driver (or other) configuration data at a gateway is to be made (504), the indicated change is made via the edge agent (506). For example, a managed IoT smart app may be configured to provide data in a different manner, to use an alternate sensor and/or sensor app, to suspend operation, to send data to a different destination, etc.

Monitoring (502) and taking responsive actions as/if required (504, 506) continue until the process is done (508), e.g., the gateway is taken out of service for maintenance.

Figure 6:
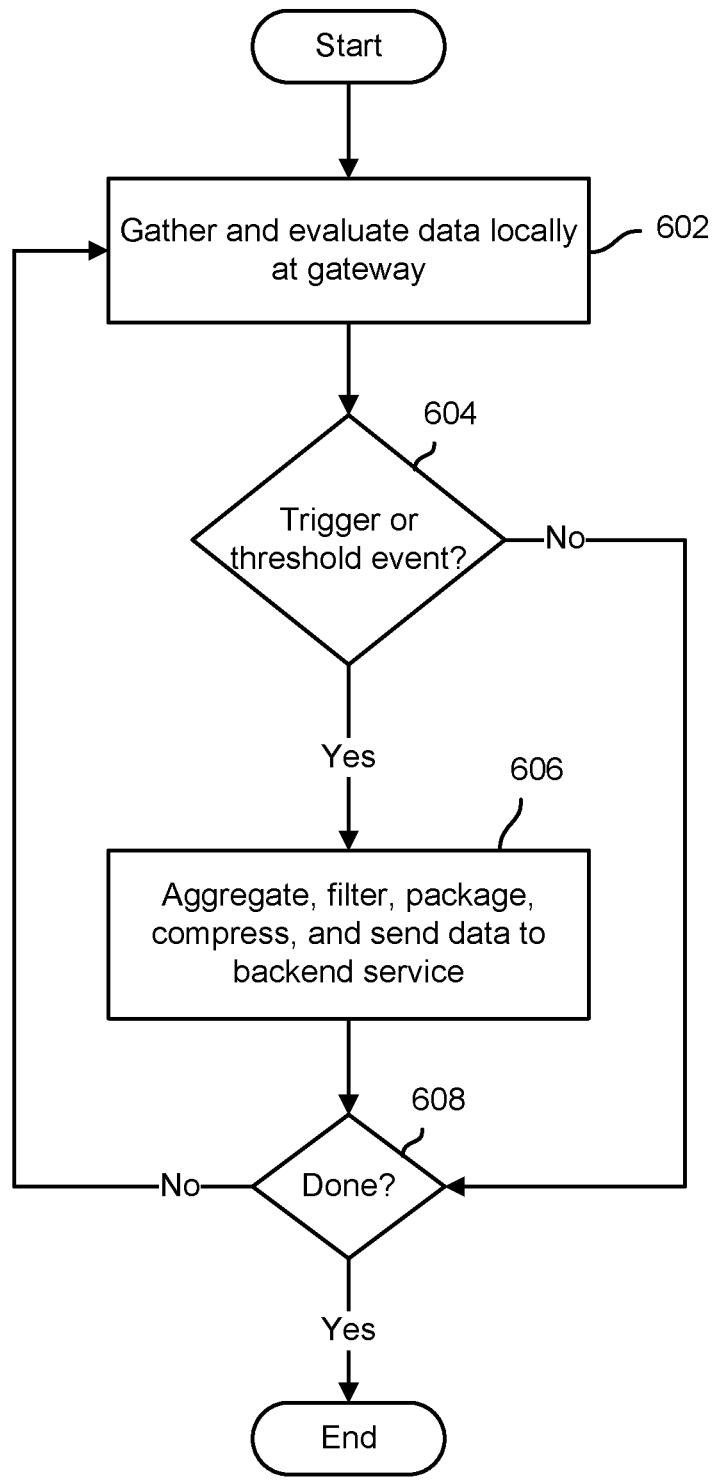
FIG. 6 is a flow chart illustrating an embodiment of a process to perform policy, security, and/or context-based processing of data at an IoT gateway or other edge device.

FIG. 6 is a flow chart illustrating an embodiment of a process to perform policy, security, and/or context-based processing of data at an IoT gateway or other edge device. In various embodiments, the process of FIG. 6 may be performed by an IoT smart app. In the example shown, sensor and/or other data is gathered and evaluated locally at the gateway (602). For example, an IoT smart app may perform analysis, such as comparing sensor output values to a threshold, performing statistical analysis, etc. If a threshold or other trigger event is detected (604), applicable sensor and/or derived or otherwise related data may be aggregated, filtered, packaged, and/or compressed and then send to an associated backend service, e.g., via a security proxy. Processing continues until done (608), e.g. the IoT smart app stops running, there is no further sensor data to process, etc.

Figure 7:
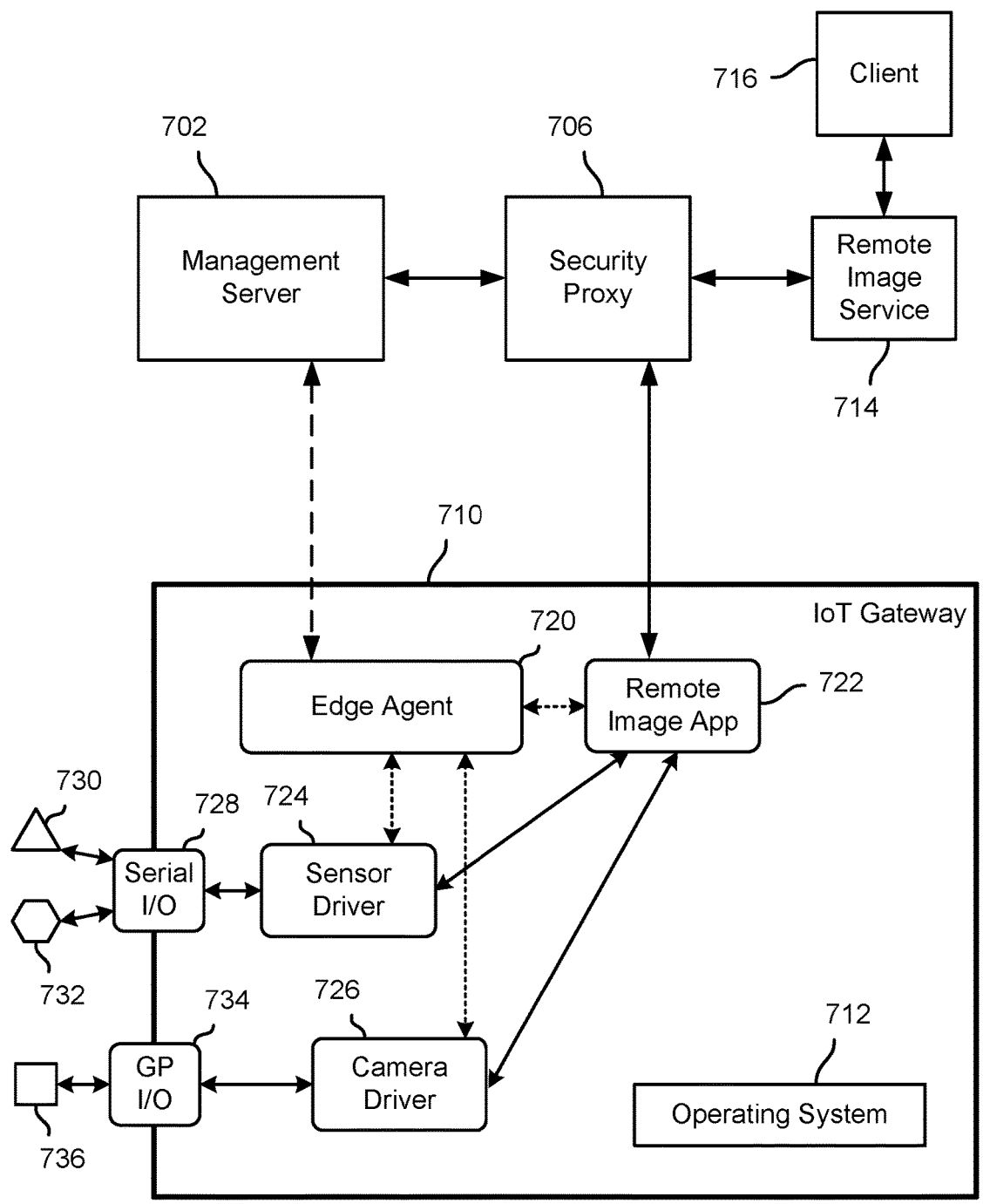
FIG. 7 is a block diagram illustrating an embodiment of a system to provide containerized management of network connected devices.

FIG. 7 is a block diagram illustrating an embodiment of a system to provide containerized management of network connected devices. In the example shown, a given set of sensors are used by associated apps and sensor drivers to provide an illustrative example of an IoT service provided using techniques disclosed herein. Management server 702 and security proxy 706 cooperate, as disclosed herein, to provide managed access to a remote image service 714. Client systems and/or devices 716 may access the service 714 to see, for example, images taken by a camera or other sensor installed at a remote physical location. IoT gateway 710 having operating system 712 running thereon may be installed at or near the monitored location. An edge agent (management app) 720 installed and running on gateway 710 manages a remote imaging app 722, sensor driver 724, and camera (sensor) driver 726, each of which may comprise a containerized application running on gateway 710. Sensor driver 724 functions as an I/O multiplexer for a serial I/O port 728 to which sensors 730 and 732 are connected. For example, sensor 730 may be a push button while sensor 732 may be a motion and/or light detector. Camera driver 726 configures and manages access to a camera 736 connected to gateway 710 via a general purpose I/O 734.

Remote image app 722 accesses sensors 730 and 732 via sensor driver 724, and camera 736 via camera driver 726. Sensor driver 724 and/or camera driver 726 may be configured to allow access only selectively and/or subject to constraints specified in their own app configuration data. For example, sensor driver 724 may be configured to provide to remote image app 722 access only to output data (e.g., click events) associated with push button 730.

By way of example, remote image app 722 may be configured to subscribe, via sensor driver 724, to click events generated by sensor driver 724 in response to receiving an indication via serial I/O 728 that the push button 730 has been pushed. In response to each occurrence of such a click event, remote image app 722 may be configured to request and obtain via camera driver 726 a burst comprising a prescribed number of images generated using camera 736. The prescribed number may be indicated, for example, in app configuration data for one or both of the camera driver 726 and the remote imaging app 722. Remote imaging app 722 may be configured to perform filtering, analysis, and/or other pre-processing of received image data. For example, remote imaging app 722 may be configured to detect the presence (or not) of a face in an image, and to send to remote imaging service 714 only those images that contain a face. Or, remote imaging app 722 may be configured to judge image quality and send only a selected representative image of a certain quality. In yet another example, remote imaging app 722 may be configured to degrade image quality and/or otherwise reduce an associated data size prior to communicating an image to the remote imaging service 714.

In various embodiments, management and security techniques disclosed herein may be applied to the example service shown in FIG. 7. For example, upon detecting a change in the security posture of gateway 710, management server 702 may send updated posture information to security proxy 706, prompting security proxy 706 to block access by remote image app 722 to remote image service 714. In another example, an administrator may indicate via an administrative interface a desired change in app behavior, such as to change the number of images included in each burst. In response, management server 702 may use edge agent 720 to change the configuration of one or both of remote image app 722 and camera driver 726 to implement the change. In yet another example, camera 736 may be replaced with a different physical device. In response, a replacement driver for camera driver 726 may be downloaded, installed, and configured. The replacement driver may be configured to implement a physical or other interface to the new camera, while continue to expose a consistent interface to remote image app 722, which in this example would not be required to be updated and/or reconfigured.

Figure 8:
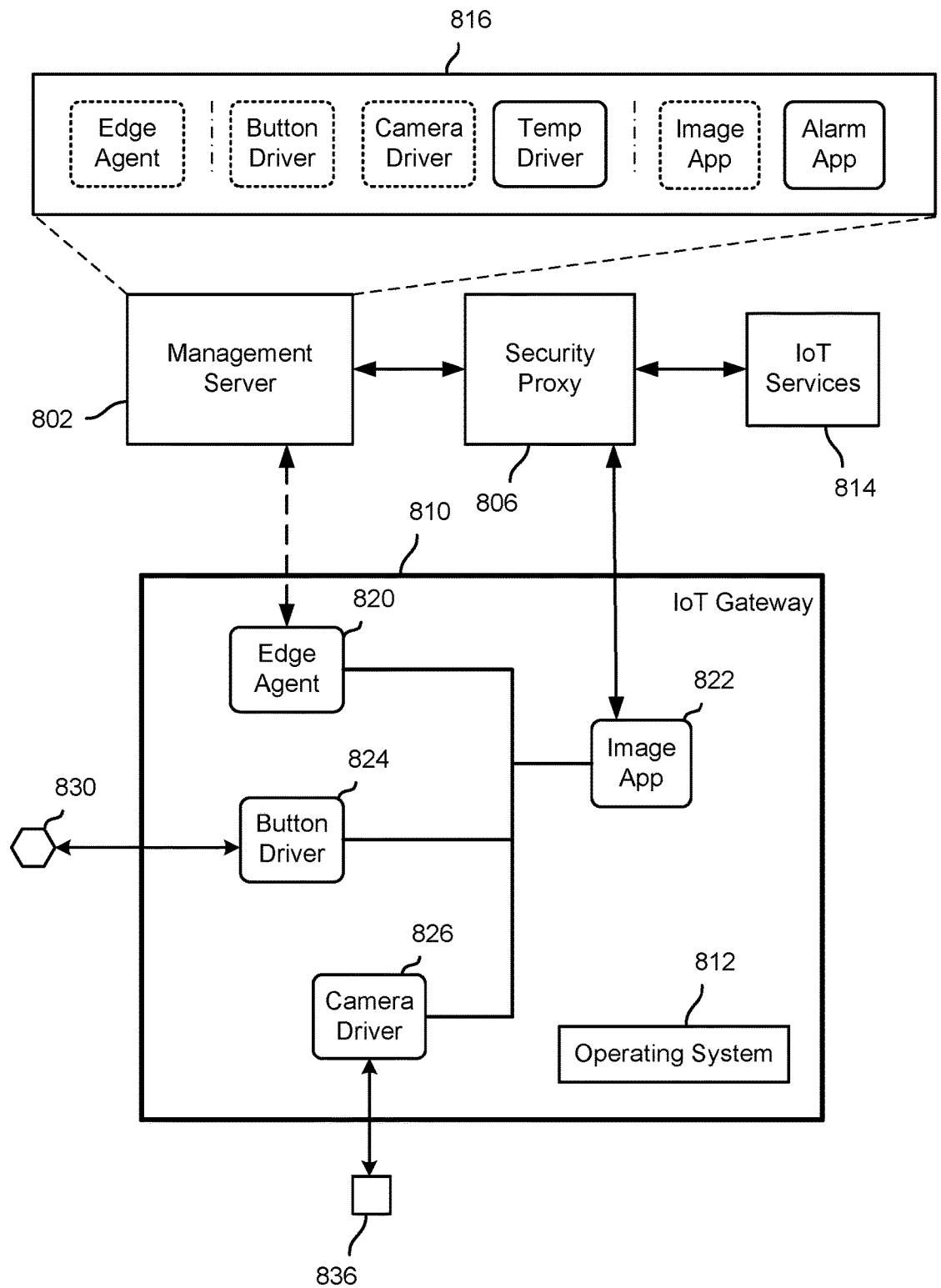
FIG. 8 is a block diagram illustrating an embodiment of a system to provision and configure an IoT gateway and/or associated resources.

FIG. 8 is a block diagram illustrating an embodiment of a system to provision and configure an IoT gateway and/or associated resources. In the example shown, a management server 802 and security proxy 806 cooperate to provide managed access to IoT services 814 by IoT smart applications running on IoT gateway 810 having operating system 812 running thereon. As in previous examples, management is performed at least in part via an edge agent 820 installed on gateway 810. Edge agent 820 configures and otherwise manages containerized applications running on gateway 810, such as image app 822, button (sensor) driver 824 associated with button sensor 830, and camera (sensor) driver 826 associated with camera 836, in this example, through communications sent via a secure connection bus.

In the example shown in FIG. 8, an IoT application store paradigm, platform, and interface 816 is provided to enable IoT smart apps, sensor drivers, and other resources to be installed on a managed IoT gateway, such as gateway 810. In this example, IoT application store interface 816 displays in dashed, outline, shadow, or other less prominently visible form icons representing containerized applications that have already been installed on gateway 810. Additional applications (temp driver, alarm app) that have not (yet) been installed on gateway 810 are displayed using solid lines.

In various embodiments, an IoT app store may be implemented as a software distribution registry or similar repository. Each application icon displayed via the app store interface, such as interface 816 in the example shown, may be associated with a corresponding downloadable software image or similar encapsulation of data required to build and run a container. Selection of an application that has not been installed may result in the corresponding image being pulled to the associated IoT gateway, which may then use the image or other data to install and run a corresponding instance of an associated containerized application.

The particular apps and sensor drivers shown in and described above in connection with FIGS. 7 and 8 are illustrative examples of apps and sensor drivers that may be used in the application agnostic architecture and approach disclosed herein. Limitless other apps, sensors drivers, and associated services may be conceived and implemented using techniques disclosed herein.

In various embodiments, applications made available via an IoT app store as disclosed herein may comprise a subset of applications included in a master inventory of applications. For example, the applications in the inventory may be filtered based on information associated with the gateway, such as a role or other data associated with an enterprise or other user with which the gateway is associated; a location or other attribute associated with the gateway; security or other posture information; group or other designation with which the gateway is associated; sensors detected to be connected to the gateway; etc.

In various embodiments, apps, sensor drivers, and/or other IoT gateway apps and tools may be developed by application developers. In some embodiments, a software development kit (SDK), application programming interface (API), open source code repository, and/or other tools and resources may be provided to facilitate the development and/or improvement of IoT gateway apps and drivers. For example, a developer associated with an enterprise, or a third party developer, may create a new or adapted sensor driver to enable a new type, make, or model of sensor to be used by one or more other IoT gateway apps and/or associated services. Apps, sensor drivers, and other code developed by third parties may be submitted for review and approval, and may be made available to be downloaded from an IoT gateway app store upon a determination being made that the app, sensor driver, etc. functions as intended and contains no malicious or otherwise risky or vulnerable code.

Using techniques disclosed herein, secure, managed access to backend services may be provided to applications and other resources comprising or otherwise associated with IoT devices.

While in a number of examples described herein external sensors connected to a gateway via a physical connection port are described, techniques disclosed herein may be applied as well to manage access to, configuration of, and use of internal sensors of the gateway device. In various embodiments, a smart device, such as a smart appliance, may be configured to serve as an IoT gateway as disclosed herein. In such implementations, a separate hardware, such as a Raspberry Pi™ or other device, may not be required.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a processor coupled to the communication interface and configured to:
communicate via the communication interface with a management server;
install one or more containerized applications on an Internet of Things (IoT) gateway, at least one of said containerized applications comprising a management agent, wherein one or more of said containerized applications other than said management agent each comprises a sensor driver application; and
run the one or more containerized applications subject to management by the management server, wherein the management agent is configured to participate, subject to control of the management server, in management of one or more other of said containerized applications including by:
communicating via a security proxy with one or more associated backend services remote from the management server based at least in part on security posture data received from the management server indicating whether the gateway is compliant with a security policy, and
configuring at least one of the sensor driver applications to implement the security posture data by permitting or denying access to an associated sensor, including by designating one or more specific backend applications as being permitted to communicate with one or more specific sensors, wherein at least one of the one or more specific backend applications is configured to:
gather sensor data locally at the IoT gateway, and in response to the sensor data meeting a threshold, send the sensor data to the associated backend services via the security proxy.

2. The system of claim 1, wherein the sensor driver application functions as an input/output (I/O) multiplexer for a physical interface via which said sensor is connected.

3. The system of claim 1, wherein one or more other of said containerized applications other than the management agent each comprises an Internet-of-Things (IoT) smart application configured to receive and use sensor data generated by said sensor, subject to management by one or both of said management server and said management agent.

4. The system of claim 3, wherein each of said IoT smart applications is configured to communicate via a security proxy with one or more associated backend services.

5. The system of claim 4, wherein said security proxy is configured to enforce one or more policies associated with said communications by said smart application.

6. The system of claim 5, wherein said security proxy is configured to take a responsive action with respect to communications by said smart application based at least in part on a security posture data received from said management server.

7. The system of claim 6, wherein said management server is configured to determine said security posture data based at least in part on data received from the system.

8. The system of claim 1, wherein the system comprises the Internet of Things (IoT) gateway, and further comprising installing said one or more containerized application on the gateway.

9. The system of claim 1, wherein an IoT gateway app store interface and server are used to install said one or more containerized applications.

10. The system of claim 9, wherein said one or more containerized applications are included in a set of containerized applications presented via said IoT gateway app store interface as being available to be installed on said gateway.

11. The system of claim 10, wherein said set of containerized applications are selected to be presented via said IoT gateway app store interface as being available to be installed on said gateway based at least in part on one or both of a policy and a user or other group with which the gateway is determined to be associated.

12. A method, comprising:
communicating via a communication interface with a management server;
installing one or more containerized applications on an Internet of Things (IoT) gateway, at least one of said containerized applications comprising a management agent, wherein one or more of said containerized applications other than said management agent each comprises a sensor driver application; and
running the one or more containerized applications subject to management by the management server, wherein the management agent is configured to participate, subject to control of the management server, in management of one or more other of said containerized applications including by:
communicating via a security proxy with one or more associated backend services remote from the management server based at least in part on security posture data received from the management server indicating whether the gateway is compliant with a security policy, and
configuring at least one of the sensor driver applications to implement the security posture data by permitting or denying access to an associated sensor, including by designating one or more specific backend applications as being permitted to communicate with one or more specific sensors, wherein at least one of the one or more specific backend applications is configured to:
gather sensor data locally at the IoT gateway, and
in response to the sensor data meeting a threshold, send the sensor data to the associated backend services via the security proxy.

13. The method of claim 12, wherein one or more of said containerized applications other than said management agent each comprises a sensor driver application configured by one or both of said management server and said management agent to provide managed access to a sensor associated with a system including said containerized applications.

14. The method of claim 13, wherein one or more other of said containerized applications other than the management agent each comprises an Internet-of-Things (IoT) smart application configured to receive and use sensor data generated by said sensor, subject to management by one or both of said management server and said management agent.

15. The method of claim 14, wherein each of said IoT smart applications is configured to communicate via a security proxy with one or more associated backend services.

16. The method of claim 15, wherein said security proxy is configured to enforce one or more policies associated with said communications by said smart application.

17. The method of claim 16, wherein said security proxy is configured to take a responsive action with respect to communications by said smart application based at least in part on a security posture data received from said management server.

18. A computer program product embodied in a non-transitory computer readable medium and comprising computer instructions for:
communicating via a communication interface with a management server;
installing one or more containerized applications on an Internet of Things (IoT) gateway, at least one of said containerized applications comprising a management agent, wherein one or more of said containerized applications other than said management agent each comprises a sensor driver application; and
running the one or more containerized applications subject to management by the management server, wherein the management agent is configured to participate, subject to control of the management server, in management of one or more other of said containerized applications including by:
communicating via a security proxy with one or more associated backend services remote from the management server based at least in part on security posture data received from the management server indicating whether the gateway is compliant with a security policy, and
configuring at least one of the sensor driver applications to implement the security posture data by permitting or denying access to an associated sensor, including by designating one or more specific backend applications as being permitted to communicate with one or more specific sensors, wherein at least one of the one or more specific backend applications is configured to:
gather sensor data locally at the IoT gateway, and
in response to the sensor data meeting a threshold, send the sensor data to the associated backend services via the security proxy.

19. The computer program product of claim 18, wherein one or more of said containerized applications other than said management agent each comprises a sensor driver application configured by one or both of said management server and said management agent to provide managed access to a sensor associated with a system including said containerized applications.

* * * * *